Sept. 16, 1930.    C. A. MARTIN    1,775,682
REGULATING SYSTEM
Filed Sept. 28, 1925    3 Sheets-Sheet 1

Inventor
Charles A. Martin
by Max H. Lebel   atty.

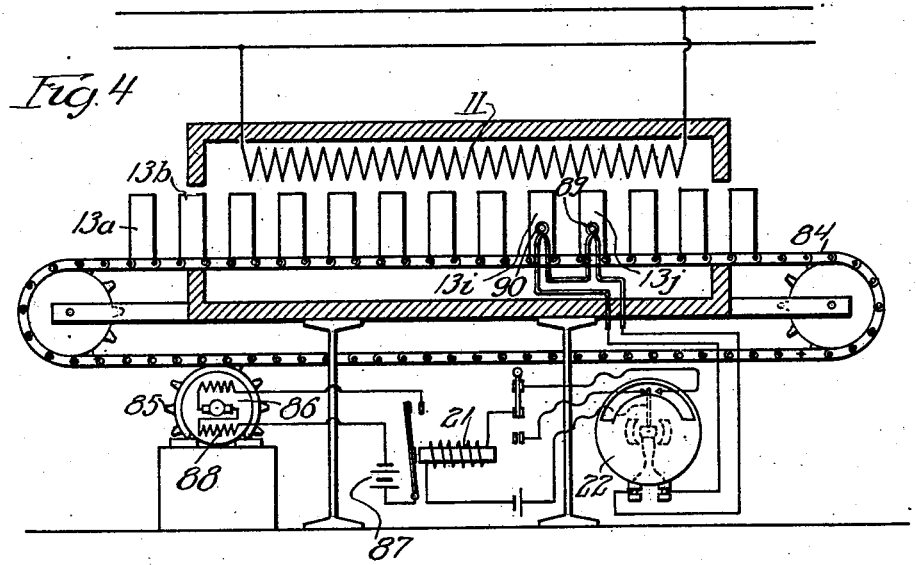
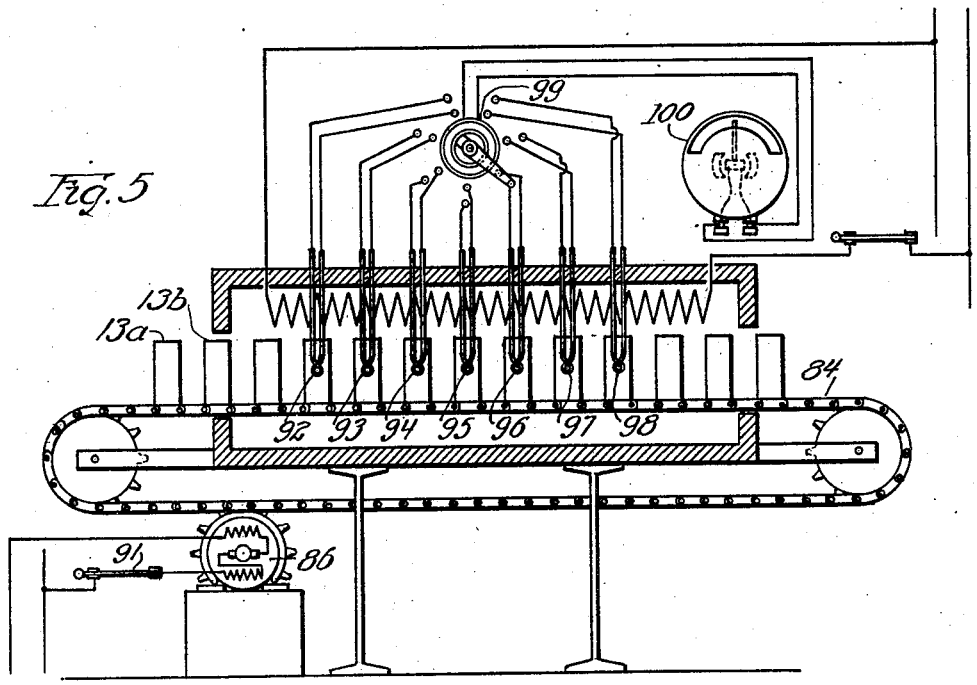

Patented Sept. 16, 1930

1,775,682

UNITED STATES PATENT OFFICE

CHARLES A. MARTIN, OF CHICAGO, ILLINOIS

REGULATING SYSTEM

Application filed September 28, 1925. Serial No 59,143.

My invention relates to regulating systems or control systems and has for its object the provision of such a system which can control the progressive change in characteristics of an element at a definite rate.

As a specific illustration of what the system is designed to accomplish, I might state that if it were desired to heat a bar of metal in a furnace through the agency of a suitably controlled heat source, that the system can be so arranged, for instance, that the difference in temperature between the bar of metal and the heat source remains a predetermined amount, say, one hundred degrees. In other words, the temperature of the metal lags about one hundred degrees behind that of the heat source. This is of use should it be desired to slowly heat the metal at a certain rate up to a certain degree, or should it be desired to cool the metal at a certain rate. The system maintains a certain difference between the element operated on and the source which controls the change of characteristics of the element.

In certain systems as at present used, as applied to the heating or cooling of material, the rate of temperature increase or decrease of the material or its proximately surrounding medium is controlled by a timing device which varies the temperature setting of the control contacts at a rate corresponding to the rate of temperature control desired. When it is desired to increase the temperature of material being heated, say 100° F. in ten minutes time, the control contacts are moved an amount corresponding to 100° F. movement of the temperature indicating device in ten minutes time. If the actual rate of temperature increase lags behind the rate of movement of the control contacts, the supply of heat is automatically increased. Should the rate of temperature increase exceed the rate of movement of the control contacts, the supply of heat would automatically be decreased. The principal feature of the present systems of controlling the rate of temperature increase or decrease is therefore the timing device which automatically changes the temperature setting of the control contacts at a predetermined rate.

My present invention eliminates the use of a timing device entirely and therefore offers features unattainable with the present systems of rate control. This is accomplished by controlling the temperature difference between two or more temperature indicating devices placed, for instance, in the same furnace. The temperature indicating devices are arranged in the furnace so that the temperature of one lags behind the temperature of the other when the furnace is heating or cooling.

I will describe certain forms which my invention may take as applied more particularly to heating and cooling of elements to be operated on by reference to the accompanying drawings, in which Fig. 1 is a diagrammatic view showing my improved system as applied to the heating of a bar of metal in a furnace;

Fig. 4 is a more or less diagrammatic view illustrating my invention as applied to a continuous type of furnace;

Fig. 5 is a diagrammatic view showing my invention applied to a continuous type of furnace, means being provided to control the time of occurrence of some critical point in the transformation of the material operated on such as vaporization, freezing, melting or the like, and Fig. 6 is a fragmentary diagrammatic view showing a modified form of heat source control.

Figure 1:
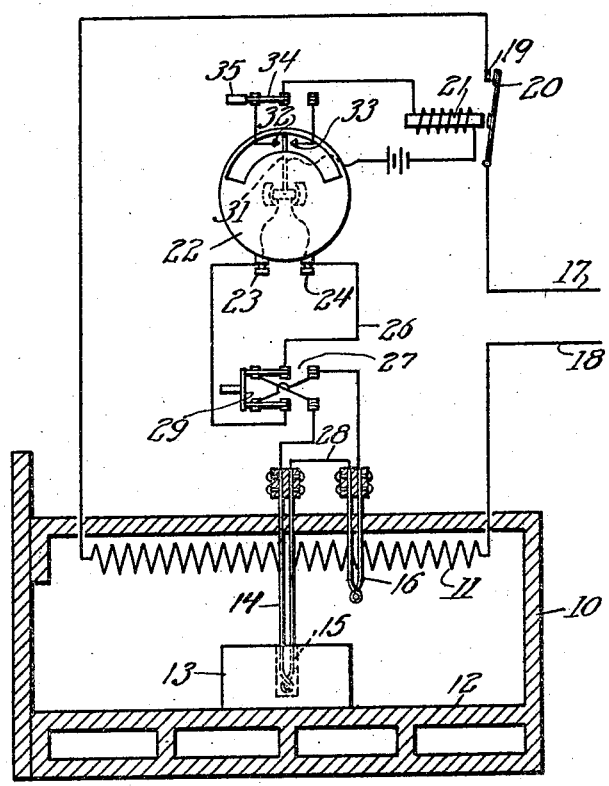

Referring more particularly to Fig. 1, I show a furnace 10 in vertical section, which furnace has a heating element 11, in this instance shown to be electrical, and has a heating table 12. A bar of material 13 is placed on the heating table with the view toward having this material slowly heated by a gradual application of increase of heat from the heating element 11. A temperature measuring device in this instance shown as a thermo-couple 14 is placed in a recess 15 within the material 13 so as to be responsive in its indications to the actual temperature of the material 13. A second thermo-couple 16 is placed adjacent the heating element 11 so as to be responsive in its indications to the actual temperature of the heating element.

My invention contemplates as already stated, the provision of means which will maintain a certain temperature difference between the metal or material 13 and the heat source 11, or as I will explain it at times in the course of this description, my invention concerns itself with controlling the temperature difference between two or more temperature indicating devices placed in the same furnace.

The current for the heating element 11 is supplied from the line wires 17 and 18 through the interposition of the relay contacts 19 and 20, which relay contacts are controlled by a relay 21 suitably controlled in accordance with the instrumentalities now to be explained. These instrumentalities consist of a temperature indicating device 22 having its terminals 23 and 24 connected by means of suitable conductors 25 and 26 to the center terminals of a double pole double throw switch 27. The two negative terminals of the thermo-couples 14 and 16 are connected together by means of a wire 28 and their positive terminals connected to the one pair of end contacts of the switch 27. These end terminals are then reversibly connected to the other end terminals of the switch 27 so that this switch serves as a reverse switch depending upon the position of the handle 29. A battery 30 furnishes current for the energization of the relay 21, one terminal of this battery being connected to one terminal of the relay and the other terminal being connected to the pointer 31 of the indicating device 22. This pointer is adapted periodically to engage contacts 32 and 33 which are respectively connected to the outer terminals of a single pole double throw switch 34, the center contact of which is connected to the other terminal of the relay 21. In this way the switch handle 35 by its position controls the connection of the aforesaid terminal of the relay 21 with either the contact 32 or the contact 33 as may be desired.

As will have been apparent from the preceding description, the thermo-couples 14 and 16 are connected in opposition to each other so that it is their difference in pressure due to their difference in temperature which causes a deflection of the measuring instrument 22. When heating, the switches 27 and 34 are in the positions shown and the control contact 32 of the measuring instrument is set at any point covered by the range of the instrument scale, depending upon the rate of temperature control desired. The rate of temperature increase is made greater by moving the control contact 32 toward the right and is made less by moving said contact to the left. In operation, the pointer 31 of the instrument comes in contact with the control contact 32 when the difference in temperature between the thermo-couples 14 and 16 is less than the difference at which the control contact is set. Contact is thereupon made between the pointer 31 and the contact 32 which results in a completion of the circuit of the relay 21, thus supplying heat to the heating element 11. As the thermo-couple 16 is exposed to the heat more than the thermo-couple 14, it heats first, however, and as soon as the predetermined difference in temperature exists between the thermo-couples, the pointer of the measuring instrument moves to the right and breaks the circuit between the pointer and the control contact 32, which breaks the circuit of the relay 21, thereby preventing a further increase in temperature until the material 13 has increased in temperature sufficiently so that the difference in temperature between the thermo-couples is less than that corresponding to the setting of the control contact 32, at which time the supply of heat will again be connected to the furnace.

Figure 3:
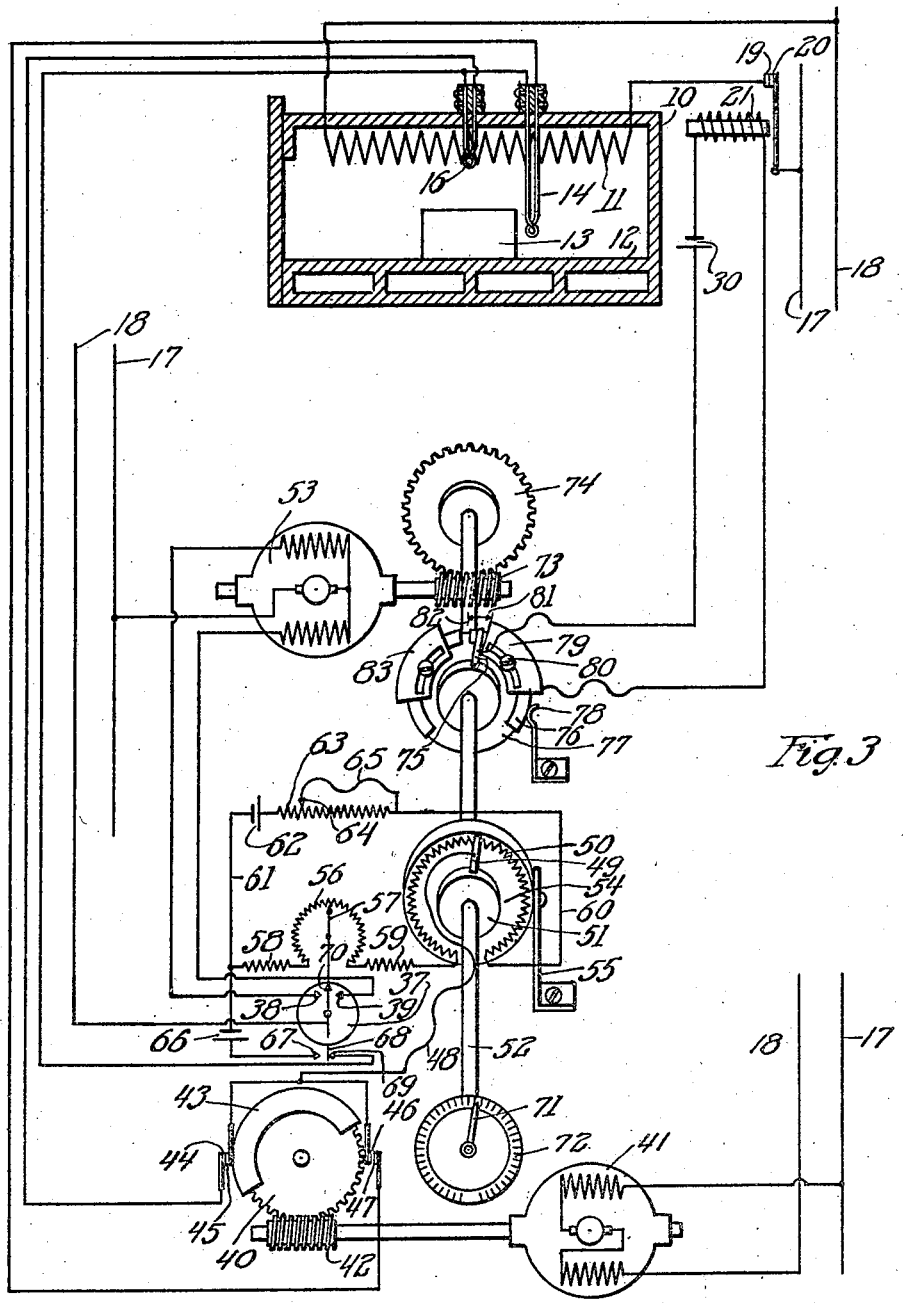
Fig. 3 shows a furnace and the parts therein similarly to that shown in Fig. 1, the system of control however being in conjunction with automatically operating devices.

When the rate of cooling of the material is to be controlled, the switches 27 and 34 are reversed. Should the thermo-couple 16 cool too far below the temperature of the thermo-couple 14, the pointer of the measuring instrument would engage the contact 33, thus completing the circuit of the relay 21 to supply heat to the furnace chamber, thus to prevent a too rapid cooling of the material 13. In practice, the pointer 31 when engaging certain control contacts would operate auxiliary apparatus which would complete the contacts of the relay circuit, as for instance shown in Fig. 3 presently to be explained.

Figure 2:
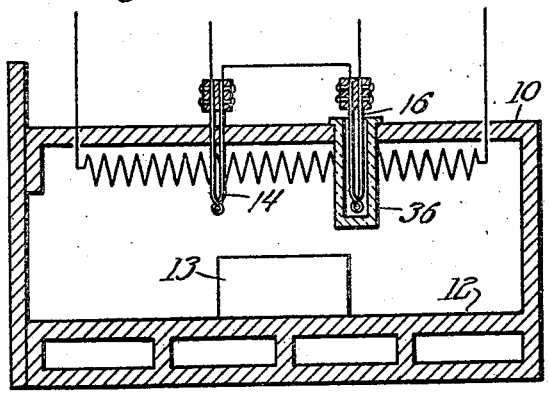
Fig. 2 is a diagrammatic view similar to Fig. 1 illustrating the temperature measuring devices in a different position.

In Fig. 2, I show another mode of installing the thermo-couples 14 and 16 in the furnace and controlling the rate of heating of the material 13 by controlling the difference in temperature between the thermo-couples. Thermo-couple 16 will of course lag behind the thermo-couple 14 in its heating due to the enclosing of this thermo-couple in a pocket 36 of refractory material. This compensates for the estimated lag of the heating of the material behind the heating characteristics of the source 11, this lag being estimated or calculated in accordance with the relative positions in the furnace occupied by the material 13 and the heating element 11.

It will also be noted that by virtue of using my improved system of controlling the difference in temperature between two temperature measuring elements, I obtain a novel result in those cases where the material is heated to its melting, vaporization or transformation point or passes through any other condition where the relation between the rate of absorption of heat and temperature increase abruptly changes.

When the material is heated in a box type or stationary furnace to its melting point, vaporization, or transformation point, the difference in temperature between the material and furnace gases is maintained approximately at the same difference through the period of melting, vaporizing, or transforming, as existed previous to the time of occurrence of the points. As a result, the furnace gases do not continue to increase in temperature far above the temperature of the material being heated, which would be the case when the rate of heating is controlled by a timing device. This retards the rate of melting, vaporization, or transformation, which under certain conditions is very desirable. For example, in the heat treatment of steels the rate of heating through the transformation point would be retarded which would tend to keep all sections of the steel at the same temperature until complete transformation of the steel took place. As the rate of expansion of steel, due to temperature, changes considerably after it passes through the transformation point, there is less possibility of distortion when the rate of transformation is retarded. This same condition exists when the steel is cooling.

When the material is heated in a continuous type furnace to its melting, vaporization, or transformation point, the time of occurrence of these points with respect to the amount of travel through the furnace can be controlled. This is accomplished by placing the temperature indicating devices alongside the material in the furnace where it is desired to have the melting, vaporization, or transformation take place. One device is placed alongside of material which has been in the furnace longer than the material which the other device is placed alongside of. When the melting, vaporization, or transformation takes place where the two temperature indicating devices are installed the difference in temperature between the two devices will be less than when the melting, vaporization, or transformation takes place somewhere else in the furnace. By automatically controlling the application of heat depending on the difference in temperature between the two temperature measuring devices, the melting, vaporization, or transformation point can be made to occur where the devices are installed in the furnace.

Whenever desirable several temperature measuring devices can be installed in the furnace at equal distances apart and measure the relative temperature increase of the material as it passes through, in order to determine the relation between the rate of heating before, and while the material is passing through its melting, vaporization, or transformation point. The supply of heat, or speed of travel of the material through the furnace can then be controlled by hand, or automatically, so as to cause the melting, vaporization, or transformation to take place at a definite place in the furnace.

The above modifications of my system will be presently explained in connection with Figs. 4 and 5.

In Fig. 3, I show my invention as applied to a furnace and the heating of material therein similarly to the application of the invention to a similar furnace in Fig. 1. In this figure, however, I show more highly organized automatic apparatus for controlling the difference in temperature between the two thermo-couples. I again show the furnace 10, heating element 11, the material 13 to be heated and the thermo-couples 14 and 16; likewise, the relay 21 for controlling the application of electricity to the heating element 11. Automatic instrumentalities are interposed between the thermo-couples and the relay to control the actuations of the relay in accordance with the temperature difference between the thermo-couples. These thermo-couples are again electrically connected, as illustrated, so that it is their combined effect which is utilized. The instrumentalities are in part similar to those shown in my co-pending application Serial No. 53,297, filed August 29, 1925, to which reference is here made. These instrumentalities include a measuring instrument 37 which has two contacts 38 and 39. This measuring instrument is influenced by the thermo-couples alternately in the normal operation of the instrument and this is brought about through the use of a continuously rotating disc 40 rotated by means of the motor 41 through the interposition of the worm 42. The disc 40 carries a cam 43 which alternately closes the pair of contacts 44 and 45 or the pair of contacts 46 and 47. Contact 44 is connected to the free terminal of the thermo-couple 16 and contact 47 is connected to the free terminal of the thermo-couple 14. The two contacts 45 and 46 are connected together and extend by means of a flexible conductor 48 to a pointer 49 which also serves as a conducting element in permanent contact with a slide resistance 50. The pointer 49 is mounted upon a collar 51 rigidly secured to a shaft 52. This shaft, as will presently appear, is periodically driven by means of a differential motor 53. The slide wire resistance 50 is mounted upon a disc 54 suitably held against rotation by the bracket 55. There is a further slide wire resistance 56, co-operating with a movable pointer 57, which is in series with the slide wire resistance 50 and also in series with resistances 58 and 59. This same circuit including the elements 50, 56, 58 and 59 is connected in series by means of the conductors 60 and 61 with a battery 62 and a resistance 63 whose effective value is adjustable by means of the movable contact point 64 serving through the agency of its flexible conductor 65 to include more or less of this resistance, as may be desired. The conductor 61 also extends to a standard cell 66, the other terminal of which is connected to a back contact 67 of a switch key 68 having the front contact 69. The instrumentalities thus far described are used for the calibration of this automatic apparatus and this calibration is accomplished as follows: The current flowing through the circuit is standardized by opposing the potential across the resistance 58 and the slide wire resistance 56 up to the contact with the arm 57, against the potential of the standard cell 66 by depressing the key 68 and adjusting the resistance 63 until the instrument pointer 70 shows no deflection from a neutral position. The potential of the thermo-couples can then be measured by completing the circuit of the key 68 through its front contact 69 and opposing the potential existing between that point of the resistance 56 touched by the arm 57 to that point of the resistance 50 touched by the arm 49 against the potential developed by the thermo-couple until the pointer 70 of the instrument 37 shows no deflection. To do this, the pointer 49 is moved along the resistance 50 until a balance is obtained.

I might say here that after the adjustment of the resistance 63, the pointer 57 may be moved from the position it occupied during the adjustment to any point necessary to compensate for the cold junction potential of the thermo-couple. The pointer 49 being fastened on the shaft 52 moves with this shaft and when said pointer and shaft move said shaft also moves a pointer 71 which is associated with a temperature scale 72. The position occupied by the contact arm or pointer 49 depends upon the temperature of the thermo-couple measured and as the arm 71 moves conjointly with the arm 49, the temperature of the thermo-couple is indicated upon the temperature scale 72. The slide wire resistance 50 is of course calibrated to cover a certain range of temperature in accordance with the temperature scale 72. The disc 40 being continuously rotatable connects first one thermo-couple and then the other to the contact arm 49. The shaft 52 is rotatable because of the interposition of the worm 73 and worm wheel 74, which worm is rotatable through the agency of the differential motor 53. The shaft 52 also carries a further arm 75 rigidly secured to said shaft, which arm co-operates with a contact strip 76 secured to a disc 77, which disc is loosely mounted upon the shaft 52 but held normally against movement by the brake 78. The arm 75 alternately, as will appear later, engages and disengages the contact strip 76 and its movement is adjustably limited by a quadrant 79 adjustably mounted in position by means of the adjusting screw 80.

As shown by Fig. 3, the thermo-couple 16 is connected to the arm 49. This causes a deflection of the pointer 70 to bring it into contact with the contact 39, to thereby actuate the motor 53 so as to rotate the shaft 52 clockwise and adjust the arm 49 along the resistance 50 until the pointer 70 of the measuring instrument again returns to its neutral position. This indicates the temperature of the thermo-couple 16 upon the temperature scale 72. At the same time, contact arm 75 is moved in a clockwise direction when the temperature of the furnace is increasing and rides upon the contact 76 until it engages with the quadrant 79. A further movement of this contact arm 75 will move the entire disc 77 against the pressure of the brake 78 in a clockwise direction and this movement continues, of course, until a balance has been obtained and the pointer 70 is in its neutral position. A further rotation of the disc 40 brings thermo-couple 14 into circuit with the arm 49 and as this thermo-couple will be colder than thermo-couple 16, the contact arm 49 is moved in a contraclockwise direction together with the contact arm 75. This is brought about by reason of the contact between the pointer 70 and the contact 38, which causes a reverse operation of the motor 53. Should the difference in temperature of the two thermo-couples be greater than the difference represented by the angular distance shown by the angle between the arrows 81 and 82, then the contact arm 75 would move off of the contact plate 76 and break the circuit of the relay 21, the circuit of this relay being controlled by the contact between the elements 75 and 76, as is apparent. Thereupon, the supply of heat is shut off from the furnace. If the difference in temperature between the two thermo-couples is within the difference as predetermined, then the contact arm 75 will remain upon the contact segment 76 and continue to supply heat to the material being heated. When thermo-couple 16 is again connected to the measuring instrument, contact arm 75 again comes into contact with the contact segment 76 to complete the relay circuit. The quadrant 79 is so adjusted that the angle between its left hand extremity and the left hand extremity of the contact plate 76 represents the degree of movement of the contact arm 75 which is occasioned by the travel of said arm due to and equivalent to the temperature difference which it is desired to maintain between the thermo-couples 14 and 16.

When controlling the rate of cooling thermo-couple 16 is colder than thermo-couple 14, which would bring about a movement of the arm 75 contra-clockwise against the quadrant 83, thus to rotate the control disc in a counter-clockwise direction if the movement is sufficient to bring this about. In the meantime, the arm 75 has of course broken its engagement with the contact segment 76 and the application of heat to the furnace is discontinued.

When the hotter thermo-couple 14 is again in circuit, then contact arm 75 moves in a clockwise direction and if the difference in temperature between the thermo-couples exceeds the amount predetermined, in accordance with an equivalent angular movement as above outlined, then contact arm 75 will engage segment 76 and heat is supplied to the furnace. If the movement is not sufficient to bring this about, then it necessarily follows that the difference in temperature between the two thermo-couples is within the prescribed limits.

In Fig. 4, I show a continuously operating furnace having the heating element 11 and I also show a plurality of elements to be heated, 13$^a$, 13$^b$, etc. These elements to be heated are mounted upon a carrier 84 suitably driven by a sprocket wheel 85 controlled by a motor diagrammatically indicated at 86. The measuring instrument is diagrammatically indicated at 22, the arrangement shown being more or less similar to that shown in Fig. 1. The measuring instrument again controls a relay 21 which controls the application of a suitable source of power 87 to certain auxiliary field control coils 88 of the motor 86, to thereby increase or slacken the speed at which said motor is continuously running. The thermo-couples 89 and 90 are placed alongside of the material, in this instance, 13$^i$, 13$^j$, and are connected in opposition as before. The material 13$^j$ will be the hottest due to its having been in the furnace a longer period of time. The control contacts of the instrument 22 are adjusted to control at any desired predetermined temperature difference between the two thermo-couples. Thermo-couples 89 and 90 represent the temperatures of two adjacent pieces of material and the temperature difference between any two adjacent pieces of material will be alike up to a certain critical point, such as melting, vaporization, or other transformation. The pieces of material occupying equi-distant positions upon the carrier 84, the rate of heating can be readily controlled by adjusting the instrument for the maintenance of a certain temperature difference between any two adjacent or any other two separated pieces of metal.

If it is desired to have the transformation of the material at any certain point in the furnace, then the motor 86 is either speeded up or retarded until the thermo-couples indicate that temperature difference between two adjacent pieces of material which would exist with these two pieces of material at or near the transformation point.

As before stated, the absorption of heat changes at the transformation point and the difference in temperature between a piece of material at the transformation point and one which has passed through the transformation point would be different than would exist between two pieces of material which had not yet reached the transformation point.

In Fig. 5, I again show a continuously operating furnace suitably controlled by a motor 86 whose actuations may be controlled by the switch 91. In this particular instance, I again have a plurality of pieces of material 13$^a$, 13$^b$ and the like, but I employ a plurality of thermo-couples 92, 93, 94, 95, 96, 97, and 98, each occupying a different position in the furnace. Each thermo-couple through the agency of the switching device 99 may be connected to the measuring instrument 100. In this way it is possible to ascertain the actual temperatures existing at any point of the furnace and the heating of the material may be controlled to bring about any desired effect and to bring about the transformation of the material at any particular point during the travel of the material through the furnace.

I am thus enabled to measure the temperature of each piece of material or group of materials and can ascertain the relative temperature differences between adjoining pieces of the series. This will directly show the point of transformation or critical point in the passage of the material through the furnace.

Figure 6:
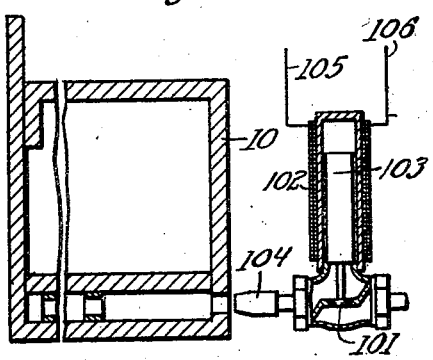

In Fig. 6, I show a furnace 10, but instead of having the heating element such as has been illustrated in connection with the other views, I show a valve 101 suitably controlled by the solenoid 102 acting upon the plunger 103 to control the flow of fuel through the nozzle 104. Conductors 105 and 106 lead away from the solenoid 102 and this can be controlled similarly to the manner in which the conductors leading away from the relay 21 are controlled in Fig. 3 or Fig. 1.

I claim:

1. Apparatus of the character described for controlling the temperature of a body, comprising a device responsive to the temperature of said body, means for controlling a change in the temperature of said body, a device responsive to the temperature of said means, and means controlled by the difference in the thermal conditions of said devices for controlling the temperature of said first aforesaid means, said second aforesaid means including a measuring instrument having a movable element and a cooperating element adjustable to effect control action by said second aforesaid means only upon a variation from a pre-determined range of temperature difference.

2. Apparatus of the character described for controlling the temperature of a body, comprising a thermo-couple responsive to the temperature of said body, means for controlling a change in the temperature of said body, a thermo-couple responsive to the temperature of said means, and means controlled by the difference in the thermal conditions of said thermo-couples for controlling the temperature of said first aforesaid means, said second aforesaid means including a measuring instrument having a movable element and a cooperating element adjustable to effect control action by said second aforesaid means only upon a variation from a predetermined range of temperature difference.

3. Apparatus of the character described for controlling the temperature of a body, comprising a device responsive to the temperature of said body, means for controlling a change in the temperature of said body, a device responsive to the temperature of said means, and means controlled by the difference in the thermal conditions of said devices for controlling the temperature of said first aforesaid means, said second aforesaid means including a measuring instrument having a movable element, a cooperating element adjustable to effect control action by said second aforesaid means only upon a variation from a pre-determined range of temperature difference, and means to associate said devices alternately with said measuring instrument.

4. Apparatus of the character described for controlling the temperature of a body, comprising a thermo-couple responsive to the temperature of said body, means for controlling a change in the temperature of said body, a thermo-couple responsive to the temperature of said means, and means controlled by the difference in the thermal conditions of said thermo-couples for controlling the temperature of said first aforesaid means, said second aforesaid means including a measuring instrument having a movable element, a cooperating element adjustable to effect control action by said second aforesaid means only upon a variation from a pre-determined range of temperature difference, and means to associate said devices alternately with said measuring instrument.

5. Apparatus of the character described for controlling the temperature of a body, comprising a device responsive to the temperature of said body, means for controlling a change in the temperature of said body, a device responsive to the temperature of said means, and means controlled by the difference in the thermal conditions of said devices for controlling the temperature of said first aforesaid means, said second aforesaid means including a measuring instrument having a movable element, a cooperating element adjustable to effect control action by said second aforesaid means only upon a variation from a pre-determined range of temperature difference, and automatic means to associate said devices alternately with said measuring instrument.

6. Apparatus of the character described for controlling the temperature of a body, comprising a thermo-couple responsive to the temperature of said body, means for controlling a change in the temperature of said body, a thermo-couple responsive to the temperature of said means, and means controlled by the difference in the thermal conditions of said thermo-couples for controlling the temperature of said first aforesaid means, said second aforesaid means including a measuring instrument having a movable element, a cooperating element adjustable to effect control action by said second aforesaid means only upon a variation from a pre-determined range of temperature difference, and automatic means to associate said devices alternately with said measuring instrument.

7. Apparatus of the character described for controlling the temperature of a body, comprising a device responsive to the temperature of said body, means for controlling a change in the temperature of said body, a device responsive to the temperature of said means, and means controlled by the difference in the thermal conditions of said devices for controlling the temperature of said first aforesaid means, said second aforesaid means including a measuring instrument having a movable element, a cooperating element adjustable to effect control action by said second aforesaid means only upon a variation from a pre-determined range of temperature difference, automatic means to associate said devices alternately with said measuring instrument, and means controlled by said measuring instrument to control said first aforesaid means.

8. Apparatus of the character described for controlling the temperature of a body, comprising a thermo-couple responsive to the temperature of said body, means for controlling a change in the temperature of said body, a thermo-couple responsive to the temperature of said means, and means controlled by the difference in the thermal conditions of said thermo-couples for controlling the temperature of said first aforesaid means, said second aforesaid means including a measuring instrument having a movable element, a cooperating element adjustable to effect control action by said second aforesaid means only upon a variation from a pre-determined range of temperature difference, automatic means to associate said devices alternately with said measuring instrument, and means controlled by said measuring instrument to control said first aforesaid means.

9. Apparatus of the character described for controlling the temperature of a body, comprising a device responsive to the temperature of said body, means for controlling a change in the temperature of said body, a device responsive to the temperature of said means, and means controlled by the difference in the thermal conditions of said devices for controlling the temperature of said first aforesaid means, said second aforesaid means including a measuring instrument having a movable element, a cooperating element adjustable to effect control action by said second aforesaid means only upon a variation from a pre-determined range of temperature difference, automatic means to associate said devices alternately with said measuring instrument, means controlled by said measuring instrument to control said first aforesaid means, and means for indicating the temperature of said devices.

10. Apparatus of the character described for controlling the temperature of a body, comprising a thermo-couple responsive to the temperature of said body, means for controlling a change in the temperature of said body, a thermo-couple responsive to the temperature of said means, and means controlled by the difference in the thermal conditions of said thermo-couples for controlling the temperature of said first aforesaid means, said second aforesaid means including a measuring instrument having a movable element, a cooperating element adjustable to effect control action by said second aforesaid means only upon a variation from a pre-determined range of temperature difference, automatic means to associate said devices alternately with said measuring instrument, means controlled by said measuring instrument to control said first aforesaid means, and means for indicating the temperature of said thermo-couples.

11. A furnace having means for supporting a body to be heated in said furnace, a pair of temperature responsive devices placed at points of unlike temperature in said furnace, and means operable only upon a variation from a pre-determined range of temperature difference between said temperature responsive devices to control the operations of said furnace.

12. In combination with a heater of a pair of temperature responsive devices placed at points of unlike temperature, and means operable only upon a variation from a pre-determined range of temperature difference between said devices to control the operations of said heater.

13. A method of changing the temperature of a body at a definite rate which comprises subjecting said body to a source of heat, and changing the heat input to said source of heat only when the difference in temperature between said body and said source of heat varies from a predetermined value.

14. In a furnace, means for changing the temperature of a body at a substantially constant rate comprising a heater, means responsive to the temperature of the body, means responsive to the temperature of the heater, and means controlled by both of said responsive means operative to change the heat input to said heater only upon a variation of the temperature difference between said body and heater from a predetermined value.

In witness whereof, I hereunto subscribe my name this 5th day of September A. D., 1925.

CHARLES A. MARTIN.